(12) United States Patent
Lange et al.

(10) Patent No.: US 6,958,382 B2
(45) Date of Patent: Oct. 25, 2005

(54) POLYISOBUTENYL ETHERS AND THIOETHERS

(75) Inventors: Arno Lange, Bad Durkheim (DE); Helmut Mach, Heidelberg (DE); Darijo Mijolovic, Mannheim (DE); Hans Peter Rath, Gruenstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/698,457

(22) Filed: Nov. 3, 2003

(65) Prior Publication Data

US 2004/0102653 A1 May 27, 2004

(30) Foreign Application Priority Data

Nov. 25, 2002 (DE) .......................... 102 54 924

(51) Int. Cl.[7] .............................. C08G 65/04
(52) U.S. Cl. .................. 528/421; 408/403; 408/411; 408/412; 408/416; 408/495; 525/113; 525/182; 525/194; 525/333.7; 525/423; 525/424; 525/179
(58) Field of Search ............... 528/421, 408, 528/403, 411, 412, 416, 495; 525/424, 423, 333.7, 113, 179, 182, 194

(56) References Cited

U.S. PATENT DOCUMENTS 3,917,496 A  11/1975  Nakagawa
5,008,338 A  4/1991  Riddick et al.
5,225,486 A * 7/1993  Money et al. ............... 525/113
5,977,255 A * 11/1999  Li et al. ...................... 525/102

FOREIGN PATENT DOCUMENTS

| CA | 2 050 967 | 12/2003 | |
| DE | 0 410 180 A1 * | 1/1991 | ............. C08F/8/08 |
| EP | 0 342 792 A1 | 11/1989 | |
| EP | 0 369 641 A1 | 5/1990 | |
| EP | 0 410 180 A1 | 1/1991 | |
| EP | 0 415 749 A2 | 3/1991 | |
| EP | 0 476 485 A1 | 3/1992 | |
| WO | WO 00/63257 | 10/2000 | |

* cited by examiner

Primary Examiner—Johann Richter
Assistant Examiner—Chukwuma Nwaonicha
(74) Attorney, Agent, or Firm—Oblon, Spivak, mcClelland, Maier & Neustadt, P.C.

(57) ABSTRACT

A process for preparing polyisobutenyl (thio)ethers by reacting a polyisobutene epoxide having at least one terminal epoxide group with itself, with other epoxides and/or with nucleophiles selected from among alcohols and thiols in the presence of a Lewis-acid compound as catalyst and/or a cationic photoinitiator with illumination is described. The side reaction of the rearrangement of the epoxide to the polyisobutenyl aldehyde is suppressed. In addition, a curable composition comprising a polyisobutene epoxide, an epoxide different therefrom and optionally a poly(thi)ol is also described.

14 Claims, No Drawings

POLYISOBUTENYL ETHERS AND THIOETHERS

The present invention relates to a process for preparing polyisobutenyl ethers and thioethers, (hereinafter collectively referred to as "polyisobutenyl (thio)ethers") from a polyisobutenyl epoxide and also to the polyisobutenyl (thio)ethers obtainable by the process.

The ring opening of epoxides by means of nucleophiles such as amines, alcohols or thiols in the presence of acid catalysts usually proceeds simply and exothermically to give, depending on the nucleophile chosen, hydroxyalkylamines, hydroxyalkyl ethers or hydroxyalkyl thioethers. However, relatively highly substituted epoxides such as polyisobutene epoxides generally rearrange to form the aldehyde under these conditions.

EP-A 0 476 485 describes the reaction of polyisobutenyl epoxides with amines or alkanolamines. In this reaction, nucleophilic opening of the epoxide ring by the nitrogen atom of the amine or the alkanolamine occurs and polyisobutenyl amino alcohols are obtained.

WO 00/63257 describes the conversion of polyisobutenyl epoxides into aldehydes by means of acid catalysts such as zinc bromide or a mixture of sulfuric acid and phosphoric acid.

The present invention provides a process for preparing polyisobutenyl (thio)ethers by reacting a polyisobutene epoxide having at least one terminal epoxide group with
i) itself,
ii) other epoxides and/or
iii) nucleophiles selected from among alcohols and thiols, in the presence of
a) a Lewis-acid compound as catalyst and/or
b) a cationic photoinitiator with illumination.

The polyisobutene epoxide preferably has one of the formulae Ia to Id

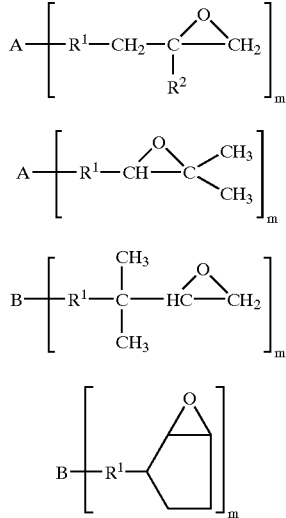

where A is hydrogen or the radical of an inifer molecule, B is chlorine or the radical of a coupling agent, $R^1$ is a chain comprising isobutene units, $R^2$ is hydrogen or methyl and m is an integer from 1 to 6, preferably 1, 2 or 3.

The polyisobutene epoxide preferably has a molecular weight of from 200 to 50 000, more preferably from 1 000 to 10 000.

The invention additionally provides the polyisobutenyl (thio)ethers obtainable by the above process.

The process of the present invention can be employed for a wide variety of purposes, e.g. for crosslinking telechelic or star-shaped polyisobutene epoxides, either by direct reaction of the terminal epoxide groups with one another and/or by reaction of the terminal epoxide groups with added poly(thi)ols; for the functionalization or modification of cationically polymerizable epoxy resins with polyisobutenyl radicals, in which case poly(thi)ols can be present as hardeners; or for preparing polyisobutenyl ethers (thio)alcohols which serve, for example, as starters for the preparation of polyoxyalkylene oxides.

The Lewis-acid compound is generally selected from among halides and sulfonates, e.g. triflates, of boron, aluminum, gallium, antimony, titanium, tin, vanadium, iron and the rare earth metals. In the case of aluminum, monoalkylaluminum dichlorides and dialkylaluminum chlorides are also possibilities. Boron trifluoride, boron trichloride, aluminum chloride, iron trichloride and titanium tetrachloride are preferred. It is likewise possible to use complexes of the Lewis acids with ethers, phenols or alcohols, e.g. $BF_3 \cdot 2C_6H_5OH$ or $BF_3 \cdot 2(C_2H_5)_2O$.

Cationic photoinitiators are known and are used, for example, for curing epoxy resins. Typical cationic photoinitiators are onium salts, ferrocenium salts and diazonium salts. Preferred onium salts are selected from among sulfonium and iodonium salts, e.g. triarylsulfonium salts or diaryliodonium salts. The counterions of the onium salts, ferrocenium salts or diazonium salts are nonnucleophilic anions such as tetrafluoroborate, tetrakis(pentafluorophenyl)borate, hexafluorophosphate or hexafluoroantimonate. Suitable commercial cationic photoinitiators are, for example, the following compounds:

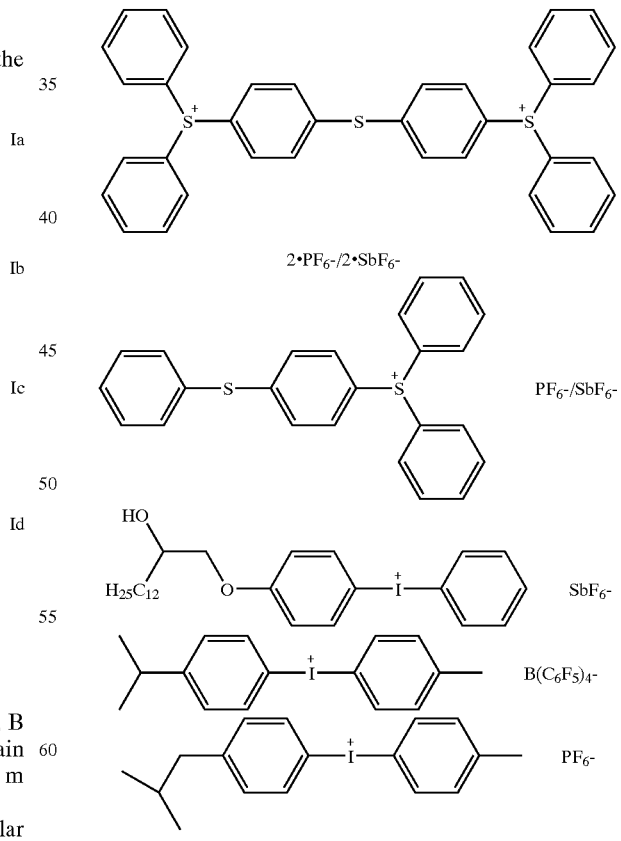

Under illumination, the onium salts lead to formation of superacids which catalyze the ring opening of the polyisobutene epoxide.

Illumination can be carried out by means of UV light, visible light, electron beams or gamma radiation. Suitable conditions are generally those which are used in the cationic polymerization of epoxy resins.

Polyisobutene epoxides having terminal epoxide groups are known. They are obtained by epoxidation of polyisobutenes having terminal olefinic double bonds (e.g. in the form of terminal allyl, vinylidene, dimethylvinyl or cyclopentyl groups) by means of known epoxidation reagents, e.g. peracetic acid, m-chloroperbenzoic acid or hydroperoxides, and, if appropriate, epoxidation catalysts in an inert solvent or in bulk (cf., for example, G. Dittius in Houbel-Weyl, Vol. 6/3, 4th Edition, p. 385, G. Thieme Verlag Stuttgart 1965, or D. Swern, Org. React. Vol. VII, 378 (1953)). The epoxidation of a polyisobutene by means of m-chloroperbenzoic acid is described by J. P. Kennedy et al., J. Polym. Sci.: Polym. Chem. Ed. Vol. 20, 2809 to 2817 (1982). EP-A 0 476 485 describes the epoxidation of polyisobutene using peracetic acid or tert-butyl hydroperoxide. Very high yields of epoxides are also obtained by reacting the polyisobutene with hydroperoxides, e.g. tert-butyl hydroperoxide, in the presence of transition metal catalysts such as molybdenum or tungsten salts or complexes.

The polyisobutenes used can be obtained according to known methods by cationic polymerization of isobutene, where a double bond remains in the last monomer unit incorporated after termination of the polymer chain (cf., for example, DE-A 27 02 604 and EP-A 0 145 235). Polyisobutenes from a $BF_3$ catalyzed polymerization are particularly advantageously used (cf., for example, EP-A 0 628 575). They contain a high proportion of vinylidene (—C(CH$_3$)=CH$_2$) and dimethylvinyl (—CH=C(CH$_3$)$_2$) end groups.

Polyisobutenes having terminal unsaturation can also be prepared by living cationic polymerization of isobutene, as described, for example, in "Carbocationic Macromolecular Engineering", Kennedy and Ivan, Hauser Publishers, 1992, or EP-A 713 883. The polymerization is in this case initiated by suitable initiator molecules (inifers), in general organic tertiary halides such as meta- or para-dicumyl chloride, and a Lewis acid such as titanium tetrachloride. The halogen-terminated polymer formed can be dehydrohalogenated by treatment with a base such as potassium tert-butoxide or by thermal treatment, forming vinylidene groups (—CH$_2$—C(CH$_3$)=CH$_2$) at the ends of the molecules. As an alternative, the halogen-terminated polymer can be treated with allyltrimethylsilane, as a result of which the ends of the molecules become terminated by allyl groups (—CH$_2$—CH=CH$_2$), as described in EP-A 264 214. The inifer can be selected so that polymer chains grow in one direction or more than one direction by addition of isobutene molecules, resulting in linear or star-shaped polymers. The inifer is generally a molecule of the formula

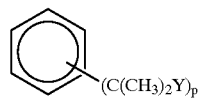

where Y is halogen, preferably chlorine or bromine, $C_1$–$C_6$-alkoxy or $C_1$–$C_6$-alkylcarbonyloxy and p is 1, 2 or 3.

It is also possible to employ a converse construction principle and use olefinically unsaturated inifer molecules such as $H_2C$=CHC(CH$_3$)$_2$Cl or 3-chlorocyclopentene. The living polymer chains can then be coupled by means of suitable coupling agents to give telechelic or star-shaped polymers having olefinic unsaturation in the molecules.

Suitable coupling agents are, for example, the following compounds:

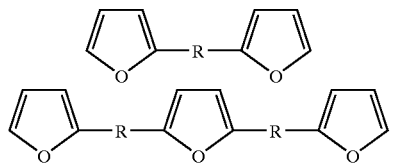

where R is methylene or 2,2-propanediyl; or

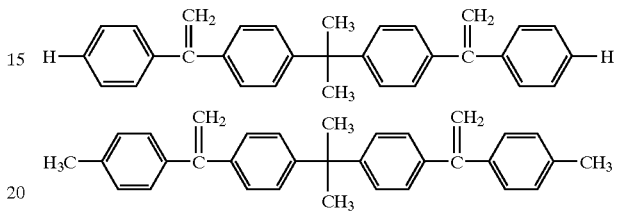

A description of suitable coupling agents may be found in the following references; the coupling reaction can be carried out in a manner analogous to the reactions described there: R. Faust, S. Hadjikyriacou, Macromolecules 2000, 33, 730–733; R. Faust, S. Hadjikyriacou, Macromolecules 1999, 32, 6393–6399; R. Faust, S. Hadjikyriacou, Polym. Bull. 1999, 43, 121–128; R. Faust, Y. Bae, Macromolecules 1997, 30, 198; R. Faust, Y. Bae, Macromolecules 1998, 31, 2480; R. Storey, Maggio, Polymer Preprints 1998, 39, 327–328; WO99/24480; U.S. Pat. No. 5,690,861 and U.S. Pat. No. 5,981,785.

The alcohol or thiol used are subject to no particular restrictions, although groups having a nucleophilicity higher than that of the hydroxy or mercapto group are generally absent or are appropriately protected for the reaction with the polyisobutene epoxide. The alcohol or the thiol can, for example, have the formula $R^3$—OH or $R^3$—SH, where $R^3$ is $C_1$–$C_{100}$-alkyl, preferably $C_1$–$C_{18}$-alkyl, which may be interrupted by one or more atoms selected from among O and S, $C_7$–$C_{18}$-aralkyl, $C_3$–$C_{18}$-alkenyl, $C_6$–$C_{12}$-aryl, $C_5$–$C_{12}$-cycloalkyl in which one or two carbon atoms may be replaced by O and/or S, heterocyclyl or heterocyclyl-$C_1$–$C_8$-alkyl. The radicals mentioned may bear one or more, usually from one to three, substituents selected from among hydroxy, $C_1$–$C_8$-alkoxy, phenoxy, halogens, nitro, cyano, $C_1$–$C_8$-alkylcarbonyl and $C_1$–$C_8$-alkyloxycarbonyl.

Heterocyclyl is preferably a five- to six-membered heterocycle which contains from one to three oxygen, nitrogen and/or sulfur atoms and may be benzo-fused, e.g. furyl, thienyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl, difluorpyridyl. An example of heterocyclyl-$C_1$–$C_8$-alkyl is furfuryl.

Examples of suitable alcohols are methanol, ethanol, isopropanol, fatty alcohols, alkoxylated fatty alcohols, phenol, benzyl alcohol and furfuryl alcohol.

Examples of suitable thiols are thioglycolic esters, methyl thiol, ethyl thiol, n-propyl thiol, t-butyl thiol, cyclohexyl thiol. Further suitable thiols may be found in Ullmann's Encyclopedia of Industrial Chemistry in the chapter "Thiols and Organic Sulfides".

In certain cases, preference is given to poly(thi)ols, i.e. alcohols or thiols, which have at least two hydroxyl and/or mercapto groups, e.g. ethylene glycol, diethylene glycol, higher poly(oxyethylene)glycols, propane-1,2-diol, poly (oxypropylene)glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, pentaerythritol, sorbitol, polyalkoxylated glycerol, polyalkoxylated trimethylolpropane or reaction products of caprolactone and polyols, or polyhydric phenols such as resorcinol. Also suitable are alcohols or thiols which have a polymeric skeleton having side chains containing the hydroxyl and/or mercapto groups. An example of such a polymeric compound is fully or partially saponified polyvinyl alcohol.

The alcohol or thiol is generally used in an amount of from 0.75 to 2.5 mol, calculated as hydroxy or mercapto groups per mole of epoxide groups of the polyisobutene epoxide, or in a larger excess.

In the absence of reaction partners, the epoxide group of a polyisobutene epoxide molecule can, on being treated with a Lewis-acid compound or preferably a cationic photoinitiator with illumination, react with the epoxide groups of further polyisobutene epoxide molecules. This mechanism can be used for crosslinking telechelic or star-shaped polyisobutene epoxides. In the presence of other epoxides, if desired in combination with poly(thi)ols as epoxy hardeners, treatment with a Lewis-acid compound or preferably with a cationic photoinitiator with illumination results in cationic cooligomerization. This mechanism can be employed for modifying the properties of epoxy resins.

Suitable epoxides are aliphatic and cycloaliphatic epoxides such as 1,2-epoxydodecane, epichlorohydrin, isoamylene oxide, α-pinene oxide, styrene oxide, epoxidized soybean oil or limonene monoxide.

Further suitable epoxy compounds are compounds having at least two epoxide groups in the molecule and their extension products formed by preextension (prepolymers for epoxy resins as described, for example, in Ullmann's Encyclopedia of Industrial Chemistry, 6th Edition, 2000, Electronic Release, in the chapter "Epoxy Resins").

Epoxy compounds having at least two epoxide groups in the molecule include, in particular:

(i) Polyglycidyl and poly(β-methylglycidyl)esters obtainable by reaction of a compound having at least two carboxyl groups, e.g. an aliphatic or aromatic polycarboxylic acid, with epichlorohydrin or β-methylepichlorohydrin. The reaction is preferably carried out in the presence of a base. Suitable aliphatic polycarboxylic acids are oxalic acid, succinic acid, glutaric acid, adipic acid, pimelic acid, azelaic acid, dimerized or trimerized linolenic acid, tetrahydrophthalic acid, hexahydrophthalic acid or 4-methylhexahydrophthalic acid. Suitable aromatic polycarboxylic acids, are, for example, phthalic acid, isophthalic acid or terephthalic acid.

(ii) Polyglycidyl or poly(β-methylglycidyl)ethers which are derived, for example, from acyclic alcohols such as ethylene glycol, diethylene glycol, poly(oxyethylene) glycols, propane-1,2-diol, poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol; or cyclic alcohols such as 1,4-cyclohexanedimethanol, bis(4-hydroxycyclohexyl)methane or 2,2-bis(4-hydroxycyclohexyl)propane; or alcohols containing aromatic rings, e.g. N,N-bis(2-hydroxyethyl)aniline or p,p-bis(2-hydroxyethylamino)diphenylmethane.

The glycidyl ethers can also be derived from monocyclic phenols such as resorcinol or hydroquinone or polynuclear phenols such as bis(4-hydroxyphenyl)methane, 4,4'-dihydroxybiphenyl bis(4-hydroxyphenyl) sulfone, 1,1,2,2-tetrakis(4-hydroxyphenyl)ethane, 2,2-bis(4-hydroxyphenyl)propane, 2,2-bis(3,5-dibromo-4-hydroxyphenyl) propane or from novolaks which are obtainable by condensation of aldehydes such as formaldehyde, acetaldehyde, chloral or furfural with phenols such as phenol, 4-chlorophenol, 2-methylphenol, 4-tert-butylphenol or bisphenols.

(iii) Poly(N-glycidyl) compounds which are obtainable by dehydrochlorination of the reaction products of epichlorohydrin with amines and have at least two amine hydrogen atoms, e.g. aniline, n-butylamine, bis(4-aminophenyl) methane, m-xylylenediamine or bis(4-methylaminophenyl)methane. Suitable poly(N-glycidyl) compounds also include triglycidyl isocyanurates, N,N'-diglycidyl derivatives of alkyleneureas, e.g. ethyleneurea or 1,3-propyleneurea, and the diglycidyl derivatives of hydantoins, e.g. 5,5-dimethylhydantoin.

(iv) Poly(S-glycidyl) compounds such as di-S-glycidyl derivatives derived from dithiols such as ethane-1,2-dithiol or bis(4-mercaptomethylphenyl) ether.

(v) Cycloaliphatic epoxy compounds such as bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl 3',4'-epoxycyclohexanecarboxylate; or mixed cycloaliphatic-aliphatic epoxy compounds such as limonene diepoxide.

The molar ratio of polyisobutene epoxide to other epoxides can be varied within a wide range and is, for example, in the range from 1:99 to 95:5, preferably from 5:95 to 50:50, in each case calculated as epoxide group equivalents.

The structure of the reaction products obtained can be illustrated by way of example by the reaction product of a polyisobutene epoxide of the formula Ia and an epoxide of the formula II

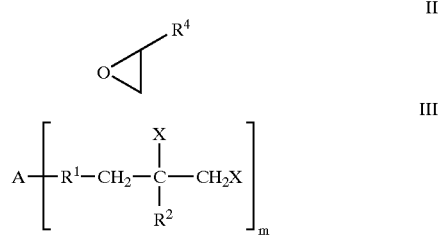

where one of the radicals X is OH and the other radical X is a radical of the formula

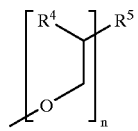

where A, $R^1$, $R^2$ and m are as defined above, $R^4$ is the radical of the epoxide and $R^5$ is a terminating group, e.g. fluorine, hydroxy or $OR^3$ (where $R^3$ is as defined above), and n is an integer in the range, for example, from 1 to 20.

The process of the present invention can be carried out in bulk or in an excess of the alcohol used or a solvent which is inert under the reaction conditions. Suitable solvents are, for example, acyclic ethers such as diethyl ether, methyl tert-butyl ether, dimethoxyethane, diethylene glycol dimethyl ether, triethylene glycol dimethyl ether, cyclic ethers such as tetrahydrofuran or dioxane and also aliphatic or aromatic hydrocarbons such as hexane or toluene or mixtures thereof. As an alternative, solvents which participate in the cationic polymerization, e.g. propylene carbonate, can also be suitable. The reaction temperature is normally in the range from the melting point to the boiling point of the reaction mixture, preferably in the range from 0 to 140° C., in particular from 15 to 80° C.

One embodiment of the invention provides a curable composition comprising a polyisobutene epoxide having at least one terminal epoxide group, an epoxide different therefrom, preferably an epoxy compound having at least two epoxide groups in the molecule, and optionally a poly(thi)ol. To cure the composition, it is brought into contact with a Lewis-acid compound. As an alternative, the composition further comprises a cationic photoinitiator, in which case curing of the composition is carried out by illumination. The curable composition can, in a customary fashion, further comprise auxiliaries, e.g. mineral or fibrous fillers such as calcium carbonate, mica, kaolin, aluminum oxide, carbon black, silica, carbon fibers, glass fibers or textile fibers.

The polyisobutenyl (thio)ethers obtained are suitable for many applications, e.g. as macromers, adhesives and sealing compositions or starters for polyalkylene oxides.

The invention is illustrated by the following example.

EXAMPLE 30 g of polyisobutenyl epoxide (Mn about 1 000) and 150 ml of methanol were placed in a 500 ml four-neck flask. While stirring vigorously, 1 ml of boron trifluoride etherate was added thereto and the reaction mixture was maintained at 50° C. for 3 hours. It was then admixed with 250 ml of hexane and the reaction was stopped by addition of 10 ml of 25% strength aqueous ammonia. The hexane phase was separated off, dried over sodium sulfate and freed of the solvent at 160° C. and 5 mbar on a rotary evaporator. This gave 36.7 g of a light-colored oil.

IR: $v_{C-O-C}$=1 074 cm$^{-1}$. The $^1$H-NMR spectrum showed that the reaction product comprised about 70% of methoxyhydroxypolyisobutene (R—CH$_2$—C(CH$_3$)(OCH$_3$)—CH$_2$—OH).

We claim:

1. A process for preparing a polyisobutenyl ether or thioether by reacting a polyisobutene epoxide having at least one terminal epoxide group with
   i) itself,
   ii) other epoxides and/or
   iii) nucleophiles selected from the group consisting of alcohols and thiols, in the presence of
   a) a Lewis-acid compound as catalyst and/or
   b) a cationic photoinitiator with illumination.

2. The process as claimed in claim 1, wherein the polyisobutene epoxide has one of the formulae Ia to Id $$\text{A}\left[\text{R}^1\text{—CH}_2\text{—C}(\text{R}^2)\text{—}\underset{\triangle}{\text{O}}\text{—CH}_2\right]_m \quad \text{Ia}$$

$$\text{A}\left[\text{R}^1\text{—CH}\underset{\triangle}{\overset{O}{-}}\text{C}(\text{CH}_3)(\text{CH}_3)\right]_m \quad \text{Ib}$$

$$\text{B}\left[\text{R}^1\text{—C}(\text{CH}_3)(\text{CH}_3)\text{—HC}\underset{\triangle}{\overset{O}{-}}\text{CH}_2\right]_m \quad \text{Ic}$$

$$\text{B}\left[\text{R}^1\text{—}\underset{\triangle}{\overset{O}{\diagup\diagdown}}\right]_m \quad \text{Id}$$

where A is hydrogen or the radical of an inifer molecule, B is chlorine or the radical of a coupling agent, R$^1$ is a chain comprising isobutene units, R$^2$ is hydrogen or methyl and m is an integer from 1 to 6.

3. The process as claimed in claim 1, wherein the Lewis-acid compound is selected from the group consisting of halides and sulfonates of boron, aluminum, gallium, antimony, titanium, tin, vanadium, iron and the rare earth metals.

4. The process as claimed in claim 1, wherein the Lewis-acid compound is selected from the group consisting of boron trifluoride, boron trichloride, aluminum chloride, iron trichloride and titanium tetrachloride.

5. The process as claimed in claim 1, wherein the cationic photoinitiator is selected from the group consisting of sulfonium and iodonium salts.

6. The process as claimed in claim 1, wherein the alcohol or thiol contains at least two hydroxyl and/or mercapto groups.

7. A polyisobutenyl ether or thioether obtained by the process as claimed in claim 1.

8. A polyisobutenyl ether or thioether obtained by a process as claimed in claim 1, wherein the polyisobutene epoxide has the formula Id $$\text{B}\left[\text{R}^1\text{—}\underset{\triangle}{\overset{O}{\diagup\diagdown}}\right]_m \quad \text{Id}$$

wherein B is chlorine or the radical of a coupling agent, R$^1$ is a chain comprising isobutene units and m is an integer of 1–6.

9. The process as claimed in claim 2, wherein m is 1, 2 or 3.

10. The process as claimed in claim 2, wherein the Lewis-acid compound is selected from the group consisting of halides and sulfonates of boron, aluminum, gallium, antimony, titanium, tin, vanadium, iron and the rare earth metals.

11. The process as claimed in claim 2, wherein the Lewis-acid compound is selected from the group consisting of boron trifluoride, boron trichloride, aluminum chloride, iron trichloride and titanium tetrachloride.

12. The process as claimed in claim 2, wherein the cationic photoinitiator is selected from the group consisting of sulfonium and iodonium salts.

13. The process as claimed in claim 2, wherein the alcohol or thiol contains at least two hydroxyl and/or mercapto groups.

14. A polyisobutenyl ether or thioether obtained by the process as claimed in claim 2.

* * * * *